United States Patent [19]

Krohm et al.

[11] Patent Number: 5,385,134
[45] Date of Patent: Jan. 31, 1995

[54] SYSTEM FOR MONITORING LEAKAGE INTO EXHAUST LINES

[75] Inventors: Harald Krohm, Bochum; Ludger Holscher, Ludenscheid; Andreas Nithammer, Neuenrade, all of Germany

[73] Assignee: AFT Atlas Fahrzeugtechnik GmbH, Werdohl, Germany

[21] Appl. No.: 75,760

[22] Filed: Jun. 11, 1993

[30] Foreign Application Priority Data

Jun. 13, 1992 [DE] Germany .................... 4219452

[51] Int. Cl.⁶ ................ F02D 41/14; F02D 41/22
[52] U.S. Cl. ..................... 123/676; 123/690; 73/118.1
[58] Field of Search .......... 123/676, 690; 73/118.1, 73/49.7, 49.1, 46

[56] References Cited

U.S. PATENT DOCUMENTS 3,998,095 12/1976 Tinkham et al. ................. 73/49.7
5,094,214 3/1992 Kotzan ............................ 123/479

FOREIGN PATENT DOCUMENTS

4002208A1 8/1991 Germany .

OTHER PUBLICATIONS

Exhaust Control, Automotive; Kirk-Othmer Encyclopedia of Chemical Technology; vol,. 9, pp. 494-508. (date unknown).
Methods of On-Board Misfire Detection; G. Plapp, M. Klenk, and W. Moser; SAE Paper 900232 (1990). (month unknown).

Primary Examiner—Andrew M. Dolinar
Attorney, Agent, or Firm—Darby & Darby

[57] ABSTRACT

A system for monitoring suction leakage of external air into the exhaust gas path of an internal combustion engine during intermittent reduced pressure phases of the engine, during operation, includes an oxygen concentration sensing lambda probe arranged in the path. The probe issues an output signal having a reduced pressure phase pulsation frequency component of reduced pressure phase amplitude indicative of such oxygen concentration during the reduced pressure phases. The output signal is fed to a control device which generates an error signal when that amplitude exceeds a predetermined threshold level indicative of suction entry of external air into the path during a reduced pressure phase.

6 Claims, 2 Drawing Sheets

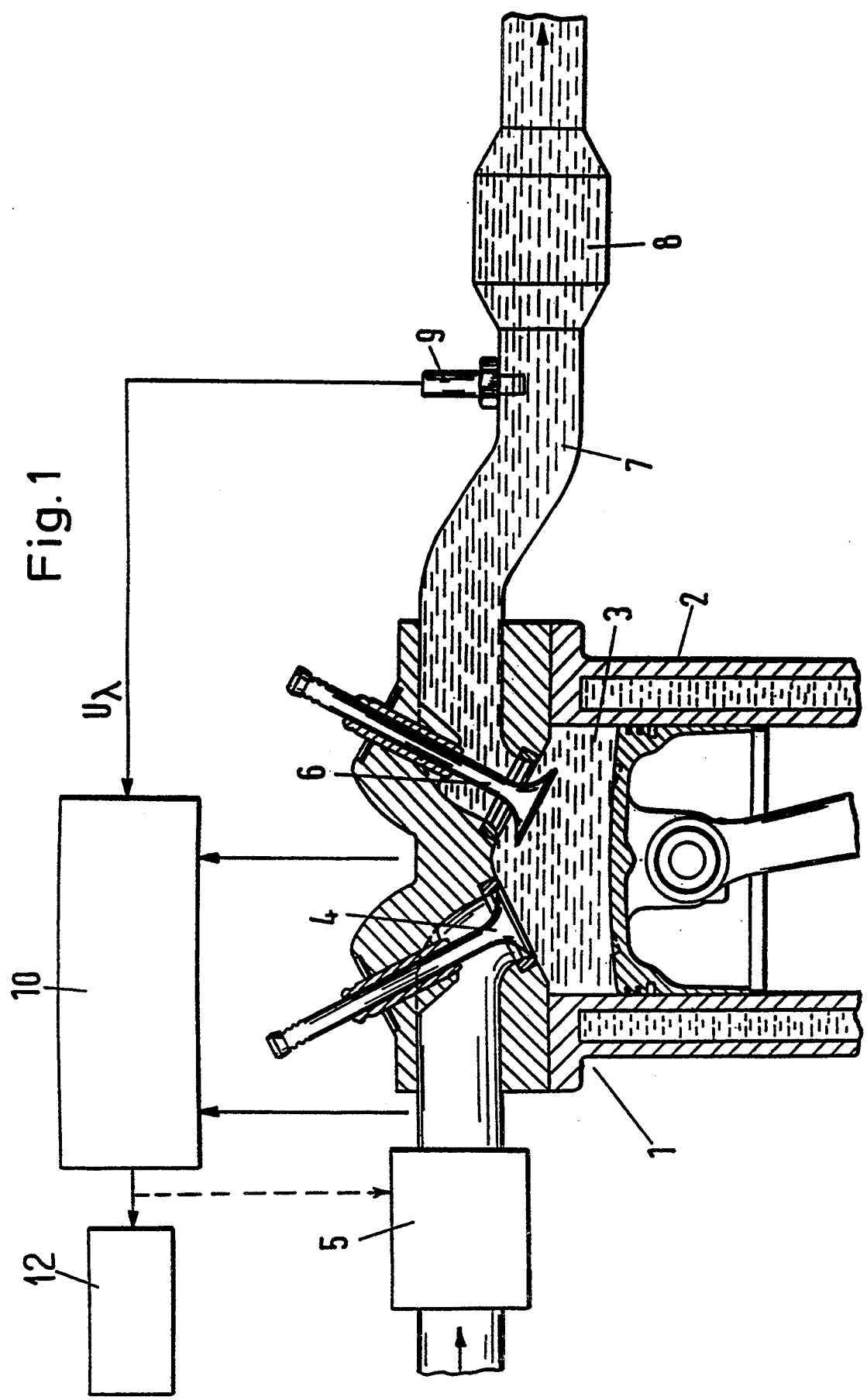

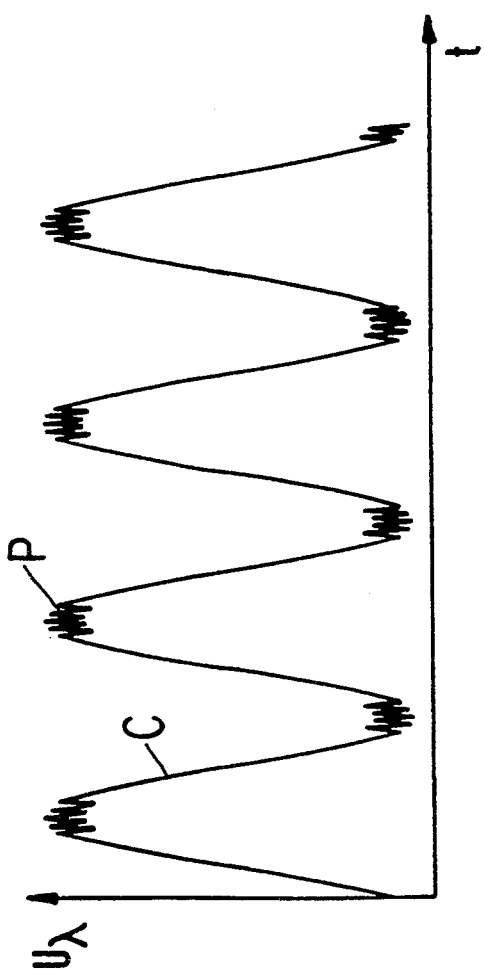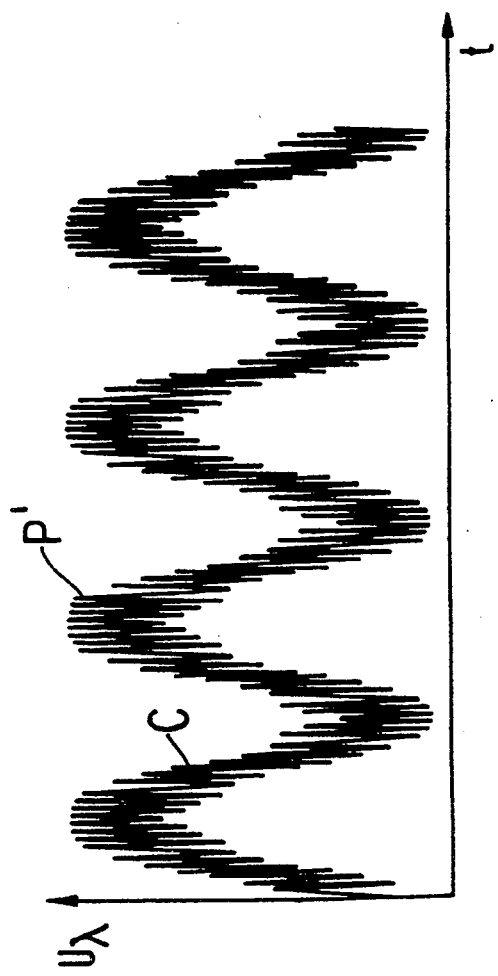

SYSTEM FOR MONITORING LEAKAGE INTO EXHAUST LINES

CROSS REFERENCE TO RELATED APPLICATION

This application discloses and claims subject matter related to that of copending U.S. application Ser. No. 08/075,763 now U.S. Pat. No. 5,351,526 filed simultaneously herewith, of overlapping inventorship herewith, entitled APPARATUS FOR MONITORING LEAKAGE INTO EXHAUST LINES.

FIELD AND BACKGROUND OF THE INVENTION

The present invention relates to a system for monitoring leakage into the exhaust gas line or path of an internal combustion engine having oxygen concentration sensing and signaling means such as a lambda probe in the path for controlling the ratio of the air/fuel mixture fed to the engine.

Lambda probes are conventionally located in the exhaust gas path of internal combustion engines to measure the oxygen concentration in the exhaust gas for accordingly determining by feedback technique the proper ratio of the air/fuel mixture to be fed to the engine. The output signal of the lambda probe has a step at an air/fuel mixture ratio of 1, so that the engine can be regulated to operate with an air/fuel ratio of about such value. In normal operation, the lambda probe output signal contains control oscillations of around 10 Hz, i.e. constituting the so-called lambda control frequency of the output signal.

By way of such lambda probe feedback technique, the formation of the air/fuel mixture fed to an engine intake valve can be controlled to achieve optimum combustion in the associated cylinder and optimum cleaning of the resulting exhaust gas in a conventional three way catalytic converter located in the exhaust gas path downstream from the associated exhaust valve.

A three way catalytic converter is normally used in the internal combustion engine exhaust line of a motor vehicle to make sure that the exhaust gas vented to the atmosphere meets governmental regulatory emission standards for hydrocarbons (HC), carbon monoxide (CO) and nitrogen oxides ($NO_x$), e.g. in terms of maximum permitted emission concentrations (g/km or g/mi) of these three pollutants. This type catalytic converter typically uses a reducing catalyst to reduce nitrogen oxides in combination with an oxidation catalyst for overall three way emission control of hydrocarbons, carbon monoxide and nitrogen oxides.

It is only possible to achieve effective catalytic control of these three pollutants when the exhaust gas contains a very small amount of oxygen. This means that the ratio of the air/fuel mixture fed to the engine combustion chambers must be precisely controlled, with a view to maintaining it very close to an ideal stoichiometric combustion ratio. For this purpose, the exhaust gas composition is sensed and the carburetor or like device is adjusted in dependence on the composition, via feedback control.

Since the exhaust gas is at a temperature too low for further reaction, treatment in a three way catalytic converter is necessary. However, an increased level of oxygen in the exhaust gas decreases the ability of the catalytic converter to treat the three stated pollutants in the desired manner. This adverse situation is aggravated when the exhaust gas path is subject to suction leakage of atmospheric pressure external air as can occur during intermittent reduced pressure phases in the engine during operation. Generally, each combustion cycle of an internal combustion engine occurs several thousand times per minute, e.g. in an engine of the type used in gasoline fueled motor vehicles.

A requirement for the effectiveness of this arrangement is that the exhaust gas path be sealed against leakage, i.e. avoid any lack of proper sealing, as otherwise the exhaust gas cannot reach the three way catalytic converter in desired unchanged condition for proper catalytic cleaning before venting to the atmosphere. Internal combustion engine exhaust path sealing failures become evident particularly during reduced pressure phases in the engine, which are generated under certain operating conditions by a characteristic intermittent mode of internal combustion engine operation leading to pulsations. As a result of these pulsations, during a reduced pressure phase, comparatively high oxygen containing atmospheric pressure exterior air can penetrate into the engine exhaust gas path by suction leakage action at a sealing failure site.

It is desirable to provide a system for detecting lack of sealing of the combustion engine exhaust gas path, and particularly suction leakage of external air into such path.

SUMMARY OF THE INVENTION

It is an object of the invention to overcome prior art drawbacks and to provide a system for detecting sealing failures in the internal combustion engine's exhaust gas line or path, leading to suction leakage of external air into the path, during operation of the engine, such as by measuring the amplitude of the pulsation frequency component of the lambda probe output signal and generating an error signal upon its exceeding a threshold value amplitude during reduced pressure phases of the engine during operation. This is indicative of an increase in oxygen concentration as caused by external air suction leakage into the exhaust gas path.

The measuring of the amplitude of the pulsation frequency component of the output signal from the lambda probe takes place at a time corresponding to the reduced pressure phases of the engine characteristic.

In this connection, the term "reduced pressure phases of the engine characteristic" denotes those running or operating conditions of the engine in which, at least at some point in time and at least in locally limited manner, the pressure in the exhaust gas path drops below atmospheric pressure.

The invention is distinguished from the state of the art in that the periodical quasi-periodic pulsations of the lambda probe output signal, generated by the intermittent operating of the engine, are measured. Where there is a leakage, uncombusted atmospheric air penetrates into the exhaust gas path and thereby increases the amplitude of the pulsations. Upon exceeding a threshold value, an error signal, e.g. either as a diagnostic signal or an alarm signal, is generated which provides an indication of a sealing failure in the path. Thus, the invention makes possible a novel desirable self-diagnosis of the arrangement.

A more accurate sensing of the lambda probe output signal can be achieved by filtering out the pulsation frequencies to separate this signal component from the lambda control frequency signal component for monitoring.

According to the invention, an improvement is provided in a method for monitoring the air/fuel mixture of an internal combustion engine having an exhaust gas path and arranged for air/fuel mixture operation, including intermittent reduced pressure phases of the engine, during operation, in which the path undergoes periods of reduced pressure relative to the atmospheric pressure of external air, and using a lambda probe in the path to sense the oxygen concentration in the exhaust gas and issue an output signal having a reduced pressure phase pulsation frequency component of reduced pressure phase amplitude indicative of such concentration during the reduced pressure phases, to control the engine, during operation, by controlling the ratio of the air/fuel mixture fed to the engine.

The improvement comprises monitoring the amplitude of the pulsation frequency component of the probe output signal, and generating an error signal upon such amplitude exceeding a predetermined threshold level indicative of atmospheric pressure external air suction leakage into the path during the reduced pressure phases of the engine, during operation.

The pulsation frequency component is preferably filtered out from the output signal for such monitoring.

One form of the invention concerns a method for monitoring the air/fuel mixture of an internal combustion engine including intermittent reduced pressure phases of the engine, during operation, in which the exhaust gas path of the engine undergoes periods of reduced pressure relative to the atmospheric pressure of external air, for indicating suction leakage of external air into the path during the reduced pressure phases of the engine, during operation.

The method comprises using a sensing and signaling probe in the path to sense the oxygen concentration in the exhaust gas and issue an output signal having a control amplitude and frequency component and a superimposed reduced pressure phase pulsation frequency component of reduced pressure phase amplitude indicative of such concentration in the path during reduced pressure phases of the engine, during operation, to control the engine by controlling the ratio of the air/fuel mixture fed to the engine, and monitoring the amplitude of the pulsation frequency component of the probe output signal.

The monitoring is effected relative to a predetermined threshold level of the amplitude of the pulsation frequency component which is indicative of external air suction leakage into the path during the reduced pressure phases of the engine, during operation, and an error signal is generated upon such amplitude exceeding the predetermined threshold level.

In particular, a three way catalytic converter is disposed operatively in the path, and the probe is arranged in the path immediately before the three way catalytic converter.

Another form of the invention concerns a monitoring apparatus comprising an internal combustion engine having an exhaust gas path and being arranged for air/fuel mixture fed operation, including intermittent reduced pressure phases of the engine, during operation, in which the path undergoes periods of reduced pressure relative to the atmospheric pressure of external air, and monitoring means for detecting external air suction leakage into the path.

The monitoring means include a sensing and signaling probe arranged for sensing the oxygen concentration in the path and for issuing an output signal having a control amplitude and frequency component and a superimposed reduced pressure phase pulsation frequency component of reduced pressure phase amplitude indicative of such oxygen concentration in the path during the reduced pressure phases of the engine, during operation, and control means.

The control means are responsive to the probe output signal to control the engine, during operation, by controlling the ratio of the air/fuel mixture fed to the engine, and to generate an error signal upon the amplitude of the pulsation frequency component exceeding the predetermined threshold level which is indicative of external air suction leakage into the path during the reduced pressure phases of the engine, during operation.

BRIEF DESCRIPTION OF THE DRAWINGS

Other objects of the invention will become apparent from the within specification and accompanying drawings, in which:

FIG. 1 is a schematic partial sectional side view of an internal combustion engine provided with an exhaust gas monitoring arrangement according to the invention;

FIG. 2 is a schematic view of the curve of the undisturbed lambda probe output signal showing the natural control frequency component and the superimposed pulsation frequency component; and FIG. 3 is a view similar to FIG. 2, but showing the signal disturbed by leakage of external air into the exhaust gas path.

DESCRIPTION OF THE PREFERRED EMBODIMENTS

Referring to the drawing, a conventional internal combustion engine 1 is shown having a monitoring arrangement according to an embodiment of the invention for monitoring suction leakage of external air into its exhaust gas line.

Engine 1 has at least one cylinder 2 containing a combustion chamber 3 which is provided with an associated intake valve 4 connected to an upstream mixture forming unit 5 such as a carburetor for forming an air/fuel mixture, feed of selective ratio, and an associated exhaust valve 6 connected to an exhaust pipe defining an exhaust gas path 7 in which a conventional three way catalytic converter 8 is operatively disposed. Although engine 1 may contain only one cylinder, it normally contemplates a construction with several cylinders as in an automobile engine.

In the usual way, a conventional lambda probe 9 is arranged within path 7 before, i.e. upstream of, three way catalytic converter 8. Probe 9 serves indirectly to control the ratio of the air/fuel mixture formed in unit 5 and fed to a given cylinder 2, by sensing the oxygen concentration in the exhaust gas in path 7. This makes it possible to control by feedback technique in the conventional manner the operation of the engine for achieving as far as possible stoichiometric combustion of the air/fuel mixture in the given combustion chamber 3.

Although the positioning of probe 9 relative to exhaust valve 6 and three way catalytic converter 8 is only shown schematically, in practice probe 9 is desirably arranged in path 7 as close as possible to, i.e. just before, three way catalytic converter 8, in order to monitor to the maximum the entire distance of path 7 upstream thereof that is potentially subject to suction leakage of external air thereinto.

The output signal U lambda from probe 9 is fed to a conventional control device 10 provided with a visual fault indicator 12. Control device 10 is normally present in the arrangement for sensing and evaluating various engine characteristics to control or regulate the engine, during operation, in known manner, not forming a part of the invention improvement.

However, according to the invention, within control device 10, the signal shape of the output signal from lambda probe 9 is evaluated to monitor the amplitude of the pulsation frequency component portion thereof relative to a predetermined threshold amplitude level (value) indicative, according to the invention, of suction air leakage into path 7.

Such leakage is particularly evident in reduced pressure phases of the engine, during operation, because high oxygen content exterior air can enter into path 7 as a result of pulsations consequent intermittent engine operation. Upon the occurrence of an excess of such amplitude of the pulsation frequency component, an error or alarm signal is emitted by control device 10 which actuates a visual indication by fault indicator 12 signifying a leakage for diagnostic purposes and indicating the need for corrective servicing of the engine. Desirably, control device 10 is arranged such that the error signal visually indicated by fault indicator 12 is an ongoing visual error indication which cannot be extinguished by the engine operator, i.e. vehicle driver, and which is continuously maintained following error signal actuation, even in the absence of a continued error signal, i.e. until corrective engine servicing and authorized resetting of fault indicator 12.

It is to be understood that intermittent reduced pressure phases of the engine, during operation, occur as a result of given operating conditions, such that path 7 undergoes periods of reduced pressure relative to the atmospheric pressure of external air. During such reduced pressure phases, probe 9 senses the oxygen concentration in the exhaust gas, upstream of the three way catalytic converter 8, and issues the output signal.

Referring to FIG. 2, the curve of a conventional undisturbed output signal from lambda probe 9 is shown, with the natural frequency of the comparatively large amplitude control component C (control signal component) at about 10 Hz, and with the superimposed pulsation frequency component P of comparatively small amplitude (oxygen concentration signal component). Component P represents the amplitude range of the oxygen concentration in exhaust gas path 7 during an intermittent reduced pressure phase of the engine, during operation.

Referring to FIG. 3, the curve of the corresponding air leakage disturbed output signal from lambda probe 9 is shown, with the natural frequency of the comparatively large amplitude control component C (control signal component) remaining at about 10 Hz, but with the superimposed pulsation frequency component P' of comparatively small amplitude (oxygen concentration signal component) extending throughout the extent of control component C. Component P' represents the increased amplitude corresponding to an increase in the oxygen concentration in path 7 during intermittent reduced pressure phases of the engine, during operation, as caused by external air suction leakage into the path.

The amplitude of the pulsations of the disturbed signal component P' per FIG. 3 is substantially increased over that of the undisturbed signal component P of FIG. 2. This stems directly from entry of uncombusted atmospheric air into path 7 incident to a leak thereat.

The increase in the amplitude of the pulsation frequencies caused by air leakage into path 7 is evaluated by control device 10 using normal measurement technology following conventional technique.

The output signal is normally used by control device 10 for controlling the engine, during operation, for desired stoichiometric combustion by controlling the ratio of the air/fuel mixture formed in unit 5. However, upon detection of an excess of the amplitude of the pulsation frequency component over the stated predetermined threshold level by control device 10 of the output signal from probe 9, which indicates an increase in oxygen concentration during such a reduced pressure phase operation, control device 10 generates an error signal via fault indicator 12. This increase in oxygen concentration signifies suction leakage introduction of atmospheric pressure external air into path 7. Control device 10 is programmed in the conventional manner for operation to achieve the above described conventional functions and the monitoring and error signal generating functions per the invention.

According to a preferred embodiment, the reduced pressure phase pulsation frequencies of the oxygen concentration signal component are filtered out in control device 10 in known manner and the amplitude thereof is evaluated. If the given predetermined threshold amplitude level is exceeded, control device 10 generates an error signal which is indicated and/or stored. Conveniently, fault indicator 12 is arranged such that the error signal cannot be extinguished by the engine operator, i.e. motor vehicle driver, enabling its use as a diagnostic aid for inspection at the next service station visit.

The oxygen concentration monitoring effected according to the invention provides the advantage of detecting sealing failures in the section of the engine exhaust gas path between the associated engine exhaust valve and the three way catalytic converter by locating the lambda probe just before the three way catalytic converter in the path. This exhaust gas path section is becoming increasingly fitted with a number of complex and failure-prone devices, e.g. secondary air pumps, decoupling elements, pulse air devices, etc., thus increasing the number of potential sealing failure sites and consequent instances of suction leakage of external air into the exhaust gas path.

The specification and drawings are for illustration and not limitation, and may be modified without departing from the invention which is limited solely by the scope of the claims.

What is claimed is:

1. In a method for monitoring the air/fuel mixture of an internal combustion engine having an exhaust gas path and arranged for air/fuel mixture fed engine operation including intermittent reduced pressure phases of the engine, during operation, in which the path undergoes periods of reduced pressure relative to the atmospheric pressure of external air, and using a lambda probe in the path for sensing the oxygen concentration in the exhaust gas and for issuing an output signal having a reduced pressure phase pulsation frequency component of reduced pressure phase amplitude indicative of the oxygen concentration during the reduced pressure phases, for controlling the engine operation by controlling the ratio of the air/fuel mixture fed to the engine, the improvement, comprising:

monitoring the amplitude of the pulsation frequency component of the probe output signal, and generating an error signal upon said amplitude exceeding a predetermined threshold level indicative of atmospheric pressure external air suction leakage into the path during such reduced pressure phases of engine operation.

2. Method of claim 1 wherein the pulsation frequency component is filtered out from the output signal for such monitoring.

3. Method for monitoring the air/fuel mixture of an internal combustion engine including intermittent reduced pressure phases of the engine, during operation, in which the exhaust gas path of the engine undergoes periods of reduced pressure relative to the atmospheric pressure of external air, for indicating suction leakage of external air into the path during such reduced pressure phases of the engine, during operation, comprising:

using a sensing and signaling probe in the path for sensing the oxygen concentration in the exhaust gas and for issuing an output signal having a control amplitude and frequency component and a superimposed reduced pressure phase pulsation frequency component of reduced pressure phase amplitude indicative of the oxygen concentration in the path during such reduced pressure phases of the engine, during operation, for controlling the engine by controlling the ratio of the air/fuel mixture fed to the engine, and monitoring the amplitude of the pulsation frequency component of the probe output signal relative to a predetermined threshold level of said amplitude indicative of external air suction leakage into the path during such reduced pressure phases of the engine, during operation, and generating an error signal upon said amplitude exceeding the predetermined threshold level.

4. Method of claim 3 wherein a three way catalytic converter is disposed operatively in the path, and the probe is arranged in the path immediately before the three way catalytic converter.

5. Monitoring apparatus, comprising:

an internal combustion engine having an exhaust gas path and arranged for air/fuel mixture fed engine operation including intermittent reduced pressure phases of the engine, during operation, in which the path undergoes periods of reduced pressure relative to the atmospheric pressure of external air, and monitoring means for detecting external air suction leakage into the path, including a sensing and signaling probe arranged for sensing the oxygen concentration in the path and for issuing an output signal having a control amplitude and frequency component and a superimposed reduced pressure phase pulsation frequency component of reduced pressure phase amplitude indicative of such oxygen concentration in the path during such reduced pressure phases of the engine, during operation, and control means responsive to the output signal from the probe for controlling the engine by controlling the ratio of the air/fuel mixture fed to the engine and for generating an error signal upon said reduced pressure phase amplitude of said pulsation frequency component exceeding a predetermined threshold level indicative of external air suction leakage into the path during such reduced pressure phases of the engine, during operation.

6. Apparatus of claim 5 wherein a three way catalytic converter is disposed operatively in the path, and the probe is arranged in the path immediately before the three way catalytic converter.

* * * * *